(12) United States Patent
Le Guilloux

(10) Patent No.: US 10,957,061 B2
(45) Date of Patent: Mar. 23, 2021

(54) THREE-DIMENSIONAL RECONSTRUCTION METHOD USING A PLENOPTIC CAMERA

(71) Applicant: SAFRAN, Paris (FR)

(72) Inventor: Yann Le Guilloux, Moissy-Cramayel (FR)

(73) Assignee: SAFRAN, Paris (FR)

( * ) Notice: Subject to any disclaimer, the term of this patent is extended or adjusted under 35 U.S.C. 154(b) by 96 days.

(21) Appl. No.: 16/301,781

(22) PCT Filed: May 17, 2017

(86) PCT No.: PCT/FR2017/051184
§ 371 (c)(1),
(2) Date: Nov. 15, 2018

(87) PCT Pub. No.: WO2017/198945
PCT Pub. Date: Nov. 23, 2017

(65) Prior Publication Data
US 2019/0156501 A1 May 23, 2019

(30) Foreign Application Priority Data
May 20, 2016 (FR) ...................... 16 54548

(51) Int. Cl.
*G06T 7/557* (2017.01)
*G06T 7/593* (2017.01)

(52) U.S. Cl.
CPC .............. *G06T 7/557* (2017.01); *G06T 7/593* (2017.01); *G06T 2207/10028* (2013.01); *G06T 2207/10052* (2013.01)

(58) Field of Classification Search
CPC ........... G06T 7/557; G06T 2207/10052; G06T 2207/10028; G06T 7/593; G06T 7/60;
(Continued)

(56) References Cited

U.S. PATENT DOCUMENTS

| 2015/0374210 A1* | 12/2015 | Durr | A61B 1/07 600/111 |
| 2016/0202048 A1* | 7/2016 | Meng | G01B 11/24 348/136 |

(Continued)

FOREIGN PATENT DOCUMENTS

FR 3040798 A1 3/2017

OTHER PUBLICATIONS

Search Report issued in French Patent Application No. 1654548 dated Mar. 29, 2017.
(Continued)

*Primary Examiner* — Allahyar Kasraian
(74) *Attorney, Agent, or Firm* — Pearne & Gordon LLP

(57) ABSTRACT

A method for three-dimensional reconstruction of a surface of interest using a plenoptic camera includes: determining the three-dimensional coordinates of a series of sampling points of the object field of the camera; determining calibration data, associating at least two pixels of the optical sensor matrix with each sampling point; defining a reconstruction grid having each point associated with at least one sampling point; acquiring an image of the surface of interest using the camera; from the calibration data and the image, calculating, for each point of the reconstruction grid, the dissimilarity index value as a function of one or more dispersions, each representing a distancing between the intensity values taken, on the image, by the pixels associated with one of the corresponding sampling points; determining a three-dimensional distribution of the points of the reconstruction grid, each assigned with its dissimilarity index value; and three-dimensional reconstruction of the surface of interest.

15 Claims, 6 Drawing Sheets

(58) Field of Classification Search
CPC .. G06T 7/80; G06T 2207/10012; G02B 30/26
See application file for complete search history.

(56) References Cited

U.S. PATENT DOCUMENTS

| | | | | |
|---|---|---|---|---|
| 2016/0205394 | A1* | 7/2016 | Meng | H04N 17/002 |
| | | | | 348/187 |
| 2018/0165510 | A1* | 6/2018 | Anderson | G06T 17/005 |
| 2018/0249050 | A1* | 8/2018 | Le Guilloux | H04N 5/2256 |
| 2019/0236796 | A1* | 8/2019 | Blasco Claret | G06T 5/002 |

OTHER PUBLICATIONS

International Search Report issued in Application No. PCT/FR2017/051184 dated Aug. 2, 2017.
Written Opinion issued in Application No. PCT/FR2017/051184 dated Aug. 2, 2017.
Lefebvre, Sebastien, et al., "A 1D approach to correlation-based stereo matching", Image and Vision Computing, Elsevier, Guildford, GB, vol. 29, No. 9, May 23, 2011.
Li, Weiming, et al., "Generic camera model and its calibration for computational integral imaging and 3D reconstruction", Journal of the Optical Society of America, A, vol. 28, No. 3, Mar. 1, 2011.
Wanner, Sven, et al., "Generating EPI Representations of 4D Light Fields with a Single Lens Focused Plenoptic Camera", ISVC 2011, Part I, LNCS 6938, pp. 90-101.

* cited by examiner

THREE-DIMENSIONAL RECONSTRUCTION METHOD USING A PLENOPTIC CAMERA

This is the National Stage application of PCT international application PCT/FR2017/051184, filed on Apr. 17, 2017 entitled "THREE-DIMENSIONAL RECONSTRUCTION METHOD USING A PLENOPTIC CAMERA", which claims the priority of French Patent Application No. 16 54548 filed May 20, 2016, both of which are incorporated herein by reference in their entirety.

TECHNICAL FIELD

The invention relates to the field of plenoptic cameras for acquiring a three-dimensional scene.

The invention relates more particularly to the field of three-dimensional reconstruction methods, using such a camera.

The three-dimensional reconstruction of a surface of interest consists of providing an estimation of the three-dimensional coordinates of the points of this surface.

Prior Art

Plenoptic cameras are three-dimensional vision systems using a single photosensitive sensor for obtaining considerable compactness.

Patent application FR-1558338 describes a particular example of such a camera.

A plenoptic camera is configured to acquire a two-dimensional image in which several pixels relate to a same point of the object space.

FIGS. 1A to 1C illustrate schematically a plenoptic camera 100, and a three-dimensional reconstruction method according to the prior art.

The plenoptic camera 100 comprises an entry optical system 110 configured to receive light rays coming from an object to be imaged, or surface of interest 200.

The entry optical system 110 can be constituted by a single lens.

As a variant, the entry optical system 110 can be constituted by a set of lenses located behind each other, according to an axis of propagation of the light from the surface of interest 200, towards the entry optical system.

The entry optical system 110 achieves the optical conjugation between an object plane π, and an image plane π' receiving a matrix 120 of optical elements.

The optical elements 121 are for example microlenses, or pinholes, distributed in a coplanar manner in the image plane π'.

Microlenses 121 can each have a non-circular cross-section, for example to reduce a distance between adjacent microlenses. These can be flat-convex, biconvex, aspheric microlenses, etc.

Each of the optical elements 121 receives light rays originating from the surface of interest 200, and having passed through the entry optics 110.

After passing through an optical element 121, the light rays spread as far as a matrix optical sensor 130.

The matrix optical sensor 130 is a photosensitive sensor, for example of sensor CCD type, configured to convert an incident flow of photons into an electrical signal to form an image.

The detection surface of the matrix optical sensor 130 is constituted by a plurality of pixels, arranged preferably in lines and in columns.

It is located near the matrix 120, for example between 0.4 and 0.6 mm behind the rear faces of the optical elements 121 (distance measured according to the optical axis of the entry optical system).

The matrix 120 of optical elements is configured to distribute, on pixels of the matrix optical sensor 130, light rays originating from the surface of interest and having passed through the entry optical system.

A selection of pixels of the matrix optical sensor corresponds to each optical element 121. A light ray originating from the surface of interest 200 is directed towards one of these pixels, as a function of its angle of incidence on the optical element 121.

Said selection of pixels, associated with the same optical element, forms a macro-pixel 131.

Preferably, there is no overlap between the different macro-pixels. This overlap is avoided, especially by an adequate choice of the focal distances of the entry optical system 110 and the optical elements 121.

In this way, light rays originating from the same point on the surface of interest 200, propagate through the entry optical system 110, and the matrix of optical elements 120, as far as different pixels of the matrix optical sensor 130.

FIG. 1A illustrates outlines of rays originating from a point $200_1$ of the surface of interest 200, located in the object plane π. The image of this point is located in the image plane π', on the optical centre of an optical element 121. As a function of their angle of incidence on the optical element 121, the light rays propagate as far as one or the other of the pixels of the corresponding macro-pixel 131.

All of the pixels of the matrix optical sensor 130, associated with this point $200_1$, belong to this same macro-pixel 131.

FIG. 1B illustrates outlines of rays originating from a point $200_2$ of the surface of interest 200, located outside the object plane π, at a distance D1 downstream from this plane. The image of this point is located outside the image plane π'. Light rays propagate from the point $200_2$, towards the image of this point, passing through the optical centres of different optical elements 121.

All of the pixels of the matrix optical sensor 130, associated with this point $200_2$, belong to different macro-pixels 131, and are dispersed over a surface of width L1.

FIG. 1C illustrates outlines of rays originating from a point $200_3$ of the surface of interest 200, located out of the object plane π, at a distance D2 greater than D1 downstream from this plane. The image of this point is located outside the image plane π'. Light rays propagate from the point $200_3$, towards the image of this point, passing through the optical centres of different optical elements 121.

All of the pixels of the matrix optical sensor 130, associated with this point $200_3$, belong to different macro-pixels 131, and are dispersed over a surface of width L2 greater than L1.

In this way, dispersion in space of the pixels of the matrix optical sensor associated with the same point of the surface of interest is linked to the distance between this point and the object plane π.

This distance corresponds to a coordinate of depth of this point.

Different three-dimensional reconstruction methods are known from the prior art, exploiting this dependence between a depth coordinate and dispersion on the pixels of the matrix optical sensor.

This concerns reconstruction of epipolar image.

This is about astutely reorganizing, from an image acquired by the plenoptic camera, the distribution of pixels of the image which are associated with the same line of optical elements 121 and with the associated line of macro-pixels 131 of the sensor.

A series of columns of pixels of the image can especially be formed from pixels of the image associated with each line of macro-pixels 131. Each column of pixels of the image corresponds to a macro-pixel of the sensor, whereof the pixels are arranged as a function of their position on the macro-pixel.

When a point located in the object plane is imaged (FIG. 1A), the pixels of the image associated with this point belong to the same column of pixels.

When a point located out of the object plane is imaged (FIG. 1B or 1C), the pixels of the image associated with this point belong to adjacent columns of pixels and jointly form inclined segments. The inclination of the segment produces the depth coordinate of the point in the object field of the plenoptic camera.

An example of such a method is described in the article "*Generating EPI Representations of 4D Light Fields with a Single Lens Focused Plenoptic Camera*", ISVC 2011, Part I, LNCS 6938, pp 90-101, by Sven Wanner, Janis Gehr and Bernd Jahne.

A disadvantage of this method is that only one segment is formed by macro-pixel 131 and by optical element 121. Therefore only a single depth coordinate is obtained by optical element 121. Resolution of the three-dimensional reconstruction is therefore fairly low.

An aim of the present invention is to propose a three-dimensional reconstruction method using an image acquired by a plenoptic camera, offering better resolution than that of the matrix of optical elements.

SUMMARY OF THE INVENTION

This aim is achieved with the method of three-dimensional reconstruction of a surface of interest using a plenoptic camera comprising an entry optical system, a matrix optical sensor comprising a plurality of pixels, and a matrix of optical elements arranged between the entry optical system and the matrix optical sensor.

The method according to the invention comprises the following steps:
- determination of the three-dimensional coordinates of a series of points of the object field of the plenoptic camera, so-called sampling points;
- determination of calibration data, associating with each sampling point a set of at least two pixels of the matrix optical sensor;
- definition of a three-dimensional grid, so-called reconstruction grid, extending in the object field of the plenoptic camera and whereof each point is associated with one or more sampling points;
- acquisition of at least one image of the surface of interest by means of the plenoptic camera;
- from the calibration data and the image of the surface of interest, calculation, for each point of the reconstruction grid, of the value of a dissimilarity index which is a function of one or more dispersions, each being a dispersion between the values of intensity taken on the image of the surface of interest by the pixels associated with the sampling point ($P_j$) or with one of the sampling points ($P_j$) associated with said point of the reconstruction grid;
- determination of a three-dimensional distribution of the points of the reconstruction grid, each allocated with their value of the dissimilarity index;

three-dimensional reconstruction of the surface of interest.

This concerns sampling points, as they perform sampling in space of the points of the entire object field of the plenoptic camera.

Each point of the reconstruction grid is associated with one or more sampling points.

The term "reconstruction grid" designates a cloud of points distributed in space.

This can be a non-regular grid, whereof the points are constituted for example by the sampling points themselves.

As a variant, this can be a regular grid, the points being distributed in space according to a regular meshing defined by an elementary volumic pixel. Each point of the reconstruction grid is associated with one or more neighbouring sampling points, that is, the sampling point or the sampling points the closest in space.

In any case, the number of points of the reconstruction grid is greater than or equal to the number of sampling points.

Each dispersion relates to one sampling point.

In particular this is dispersion of the values of intensity taken by the pixels associated with this sampling point, on the image acquired.

Dispersion is representative of more or less substantial distancing of the terms of a series, relative to each other, or relative to a selected central value or average value.

Dispersion between two values of intensity designates for example the difference, or deviation, between these two values of intensity, or a function whereof the value rises when this difference or deviation increases.

Dispersion between three values of intensity or more designates for example a standard deviation between these three values of intensity or more, or a function whereof the value rises when this standard deviation increases. As a variant, the standard deviation can be replaced by any other function of the absolute values of the differences between each value of intensity and an average of said three values of intensity or more.

In this way, the dispersion of values of intensity can designate for example a deviation between two values, or a standard deviation between three values or more.

Low dispersion corresponds to high probability that the pixels receive light rays originating from the same point of the surface of interest, and therefore that the sampling point belongs to the surface of interest.

High dispersion corresponds to low probability that the pixels receive light rays originating from the same point of the surface of interest, and therefore that the sampling point belongs to the surface of interest.

The value of the dissimilarity index associated with a point of the reconstruction grid is function of such dispersion, or a combination of such dispersions, according to whether the point of the reconstruction grid is associated with one or more sampling points.

Points of the reconstruction grid having greater probability, or lower probability of belonging to the surface of interest can be identified.

The resolution of the reconstruction therefore depends on the number of points of the reconstruction grid and is not limited by the number of optical elements of the matrix of optical elements.

This easily produces a three-dimensional reconstruction method, offering better resolution than that of the matrix of optical elements.

In particular, this resolution can be at least fifty times greater than the resolution of the matrix of optical elements.

Each sampling point is located in the object field of the plenoptic camera and is associated with at least two pixels of the matrix optical sensor. In other terms this is a point of intersection, located in the object field of the plenoptic camera, between two rays then spreading through the entry system and an optical element, each as far as a pixel of the matrix optical sensor.

The sampling points extend in the object field of the plenoptic camera, downstream from the object plane, and/or upstream from the object plane, and/or in the object plane. In other terms, the method according to the invention executes three-dimensional reconstruction of a surface of interest which can extend downstream from the object plane, and/or upstream from the object plane, and/or in the object plane.

According to a first embodiment of the invention, the points of the reconstruction grid are constituted by the sampling points, and the dissimilarity index of a point of the reconstruction grid is function of a dispersion between the values of intensity taken, on the image of the surface of interest, by the pixels associated with the corresponding sampling point.

As a variant, the reconstruction grid is a regular grid, and the calculation step, for each point of the reconstruction grid, of the value of a dissimilarity index, comprises:
attribution, to all points of the reconstruction grid located at a distance from a sampling point greater than a predetermined threshold, of a same value of the dissimilarity index, so-called extreme value; and
for each of the other points of the reconstruction grid, calculation, for each sampling point associated with this point of the reconstruction grid, of the dispersion between the values of intensities taken on the image of the surface of interest by the pixels associated with said sampling point, and a combination of the several dispersions calculated to obtain the dissimilarity index.

Preferably, the three-dimensional reconstruction performs the search of a surface located in the object field of the plenoptic camera, passing through a series of points of the reconstruction grid associated with a minimal accumulated value of the values of the dissimilarity index.

The three-dimensional reconstruction can execute an algorithm of minimal cut.

As a variant, the three-dimensional reconstruction can execute a dynamic programming algorithm, considering sub-sets of optical elements of the matrix of optical elements.

The steps of determination of the three-dimensional coordinates of the sampling points and determination of the calibration data advantageously comprise the following sub-steps:
for each couple of an optical element of the matrix of optical elements, and a pixel of the matrix optical sensor associated with this optical element, determination of an image ray connecting the optical centre of the optical element and the centre of the pixel;
for each image ray determined in this way, calculation of a corresponding object ray, conjugated of the image ray by the entry optical system;
determination of all the points of intersection between at least two object rays, located in the object field of the plenoptic camera, these points of intersection forming the sampling points; and
determination of the calibration data by identifying, for each sampling point, the at least two corresponding object rays, these object rays themselves being associated with at least two image rays, and at least two pixels of the matrix optical sensor.

In addition or as a variant, the steps of determination of the three-dimensional coordinates of the sampling points and determination of the calibration data advantageously comprise the following sub-steps:
displacement of a light point in the object field of the plenoptic camera;
for each position of the light point, determination of the presence or the absence of at least two illuminated pixels on the matrix optical sensor to identify the sampling points; and
for each sampling point identified in this way, identification of the at least two illuminated pixels, to determine the corresponding set of at least two pixels of the matrix optical sensor.

The acquisition step of an image of the surface of interest can be conducted by means of a plenoptic camera in which:
the optical centres of the optical elements of the matrix of optical elements are distributed according to a distribution grid, at the points of intersection between a first series of straight lines and a second series of straight lines of this distribution grid; and
the lines of the first series of lines of the distribution grid are distributed at irregular intervals and/or the lines of the second series of lines of the distribution grid are distributed at irregular intervals.

In particular, the acquisition step of an image of the surface of interest can be conducted by means of a plenoptic camera in which the distances between two directly neighbouring lines of the first series of lines of the distribution grid are between 95% and 105% of a first average value, and/or the distances between two directly neighbouring lines of the second series of lines of the distribution grid are between 95% and 105% of a second average value which can be equal to the first average value.

In addition or as a variant, the acquisition step of an image of the surface of interest can be conducted by means of a plenoptic camera in which the distances between two directly neighbouring lines of the first series of lines of the distribution grid are distributed randomly, and/or the distances between two directly neighbouring lines of the second series of lines of the distribution grid are distributed randomly.

The acquisition step of an image of the surface of interest can be conducted by means of a plenoptic camera in which:
the optical centres of the optical elements of the matrix of optical elements are distributed according to a distribution grid, at the points of intersection between a first series of lines and a second series of lines of this distribution grid;
an object grid, whereof the distribution grid is the image by the entry optical system, is constituted by a first series of straight lines, parallel to each other, and by a second series of straight lines, parallel to each other and secant with the lines of the first series of lines; and
the lines of the first and of the second series of lines of the distribution grid comprise a plurality of curved lines.

According to an advantageous embodiment, the acquisition step of an image of the surface of interest is conducted by means of a plenoptic camera in which the lines of the first series of lines of the object grid are distributed at irregular intervals and/or the lines of the second series of lines of the object grid are distributed at irregular intervals.

The method according to the invention can comprise the acquisition of several images of the surface of interest by means of the plenoptic camera, associated with a plurality of lighting conditions for the surface of interest, and the dissimilarity index associated with each point of the reconstruction grid is obtained by combining dispersions associated with the same sampling point and with each of the several lighting conditions.

The invention also relates to a three-dimensional reconstruction device comprising a plenoptic camera and configured to conduct the steps of the method according to the invention, comprising:

a memory, for storing the calibration data; and calculation means, configured to determine the three-dimensional coordinates of the sampling points as well as the calibration data, and to receive at input the image acquired by the plenoptic camera and the calibration data, calculate the value of the dissimilarity index for each point of the reconstruction grid, determine a three-dimensional distribution of the points of the reconstruction grid each allocated with their value of the dissimilarity index, and provide at output a three-dimensional reconstruction of the surface of interest.

BRIEF DESCRIPTION OF THE DRAWINGS

The present invention will be more clearly understood from the description of embodiments given purely by way of indication and non-limiting in reference to the appended drawings, in which.

DETAILED SUMMARY OF PARTICULAR EMBODIMENTS

An underlying idea of the invention consists of working on the scale of the pixel of the matrix optical sensor, and no longer on the scale of the macro-pixel.

Figure 1A:
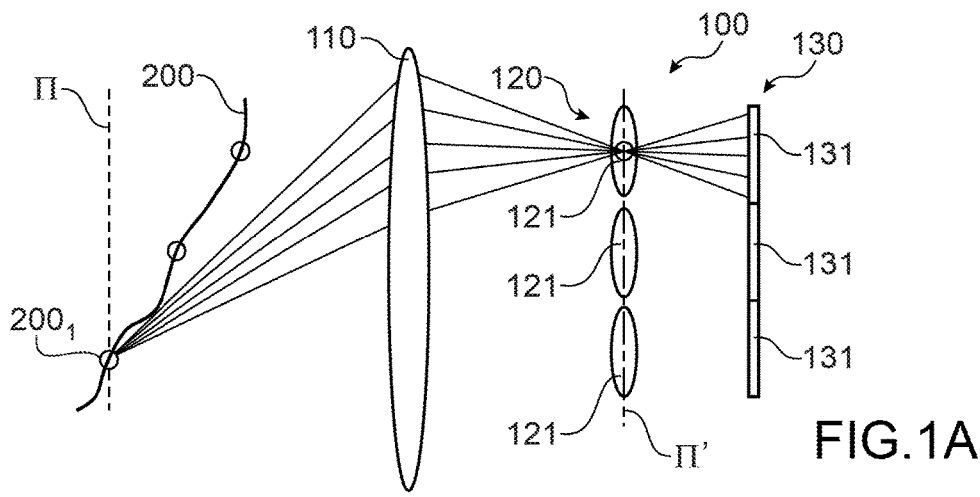
FIGS. 1A to 1C schematically illustrate a plenoptic camera.
Figure 1B:
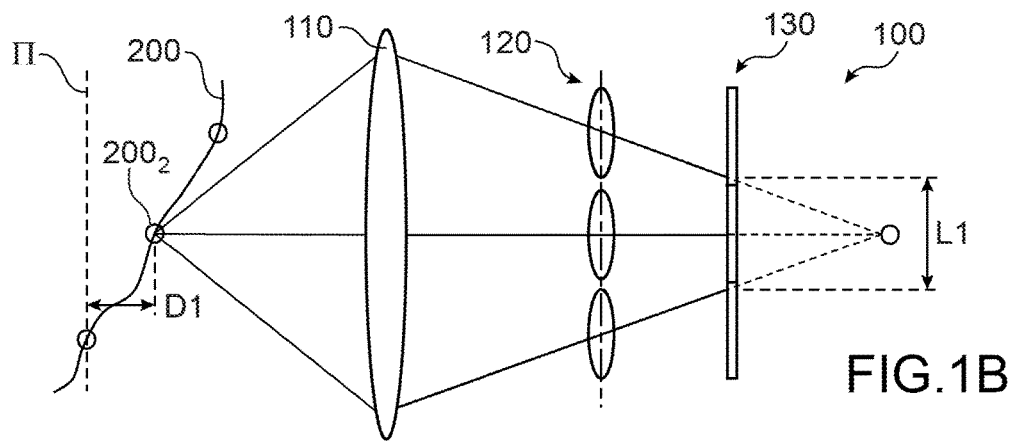
Figure 1C:
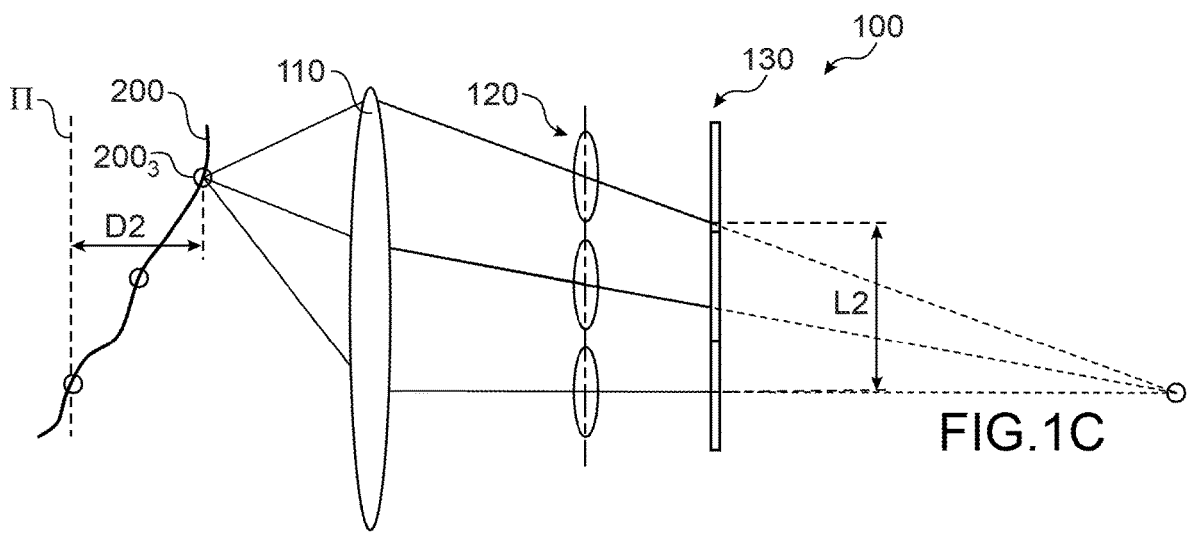
Figure 2:
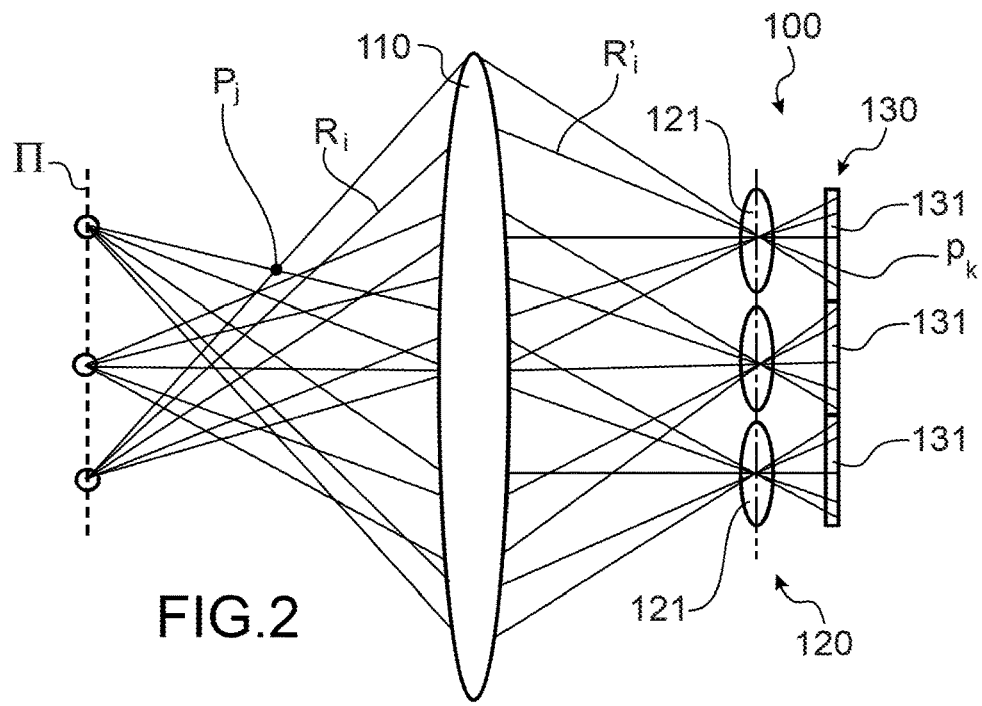
FIG. 2 schematically illustrates sampling points according to the invention.

FIG. 2 illustrates schematically a plenoptic camera 100.

To each optical element 121 corresponds a macro-pixel 131 and a plurality of image rays $R'_i$ spreading in a straight line passing through the optical centre of this optical element 121.

Each image ray $R'_i$ spreads in a straight line, in image space of the entry optical system 110, passing through the optical centre of an optical element 121, and the centre of a pixel $p_k$ of the corresponding macro-pixel 131.

The image space of the entry optical system 110 designates the space located downstream from the entry optical system, according to the direction of propagation of the light, from the surface of interest to the entry optical system.

When the optical elements 121 are pinholes, the optical centre designates the geometric centre of the hole forming a pinhole.

When the optical elements 121 are microlenses, the optical centre is located on the optical axis of a microlens and corresponds to the point of the microlens such that a light ray incident at this point is not deviated by this microlens.

Corresponding to each image ray $R'_i$ is an object ray $R_i$ located in object space of the entry optical system 110, which is the conjugated from the image ray $R'_i$ by the entry optical system 110.

The object space of the entry optical system 110 designates the space located upstream from the entry optical system, according to the direction of propagation of the light, from the surface of interest to the entry optical system.

The set of object rays $R_i$, associated with all the optical elements 121 of the matrix 120 define a multitude of points of intersection $P_j$, located in object space of the entry optical system 110.

These points of intersection $P_j$ form sampling points of the object space of the entry optical system 110, and more particularly of the object field of the plenoptic camera.

The object field of the plenoptic camera designates its field of vision, that is, the space located upstream from the entry optical system, and which can be imaged by means of the plenoptic camera.

Since the points of intersection $P_j$ correspond to points imaged on the matrix optical sensor, they are located in the object field of the plenoptic camera.

Each sampling point $P_j$ is associated with at least two object rays $R_i$, and therefore the image rays $R'_i$ and the corresponding pixels $p_k$ of the matrix optical sensor.

An underlying idea of the invention consists of itemizing, for a plenoptic camera in particular, all these sampling points, and for each of these sampling points, the at least two associated pixels of the matrix optical sensor.

Next, comparing predetermined pixels on an image acquired by the plenoptic camera can especially show near which sampling points passes the surface of interest.

Determination of the three-dimensional coordinates of these sampling points $P_j$, and, for each of these points, associated pixels $p_k$, is conducted in preliminary steps of calibration of the plenoptic camera 100.

In fact, these data are a function of the optical and geometric characteristics of the plenoptic camera 100.

This calibration can be achieved by calculating all the image rays $R'_i$, from the geometries of the matrix of optical elements and of the matrix optical sensor, then by calculating all the corresponding object rays $R_i$ and finally all the points of intersection between the object rays, in the object field of the plenoptic camera.

In a first step, the three-dimensional coordinates of the points of intersection between the object rays are determined, in the object field of the plenoptic camera, these points of intersection forming the sampling points $P_j$.

In a second step, each sampling point $P_j$ is associated with the at least two corresponding pixels of the matrix optical sensor 130. The set formed by the sampling points $P_j$, each associated with at least two corresponding pixels of the matrix optical sensor 130, forms calibration data.

In addition or as a variant, these calibration data are obtained by shifting a light point in the object field of the plenoptic camera.

Positions of the light point are identified such that at least two pixels of the matrix optical sensor are illuminated. These points form the sampling points $P_j$.

For each sampling point determined in this way, the corresponding pixels of the matrix optical sensor are the illuminated pixels associated with this position of the light point. At least two pixels of the matrix optical sensor are associated with each sampling point to form the calibration data.

In practice, a screen can be positioned normal to the optical axis of the plenoptic camera 100, and selectively turn on each pixel of the screen in turn, for different positions of the screen along the optical axis.

The two pixels or more whereof the value is greater than a predetermined threshold (the most brightly lit) are determined for each pixel of the screen and each position of the screen.

The different positions of the screen are spaced apart by a pitch lower than the resolution desired for the plenoptic camera 100.

Imperfections of the real system formed by the plenoptic camera can be considered for calibration. A rough determination of calibration data, obtained by calculation of the object rays $R_i$ can be refined in this way.

Figure 3:
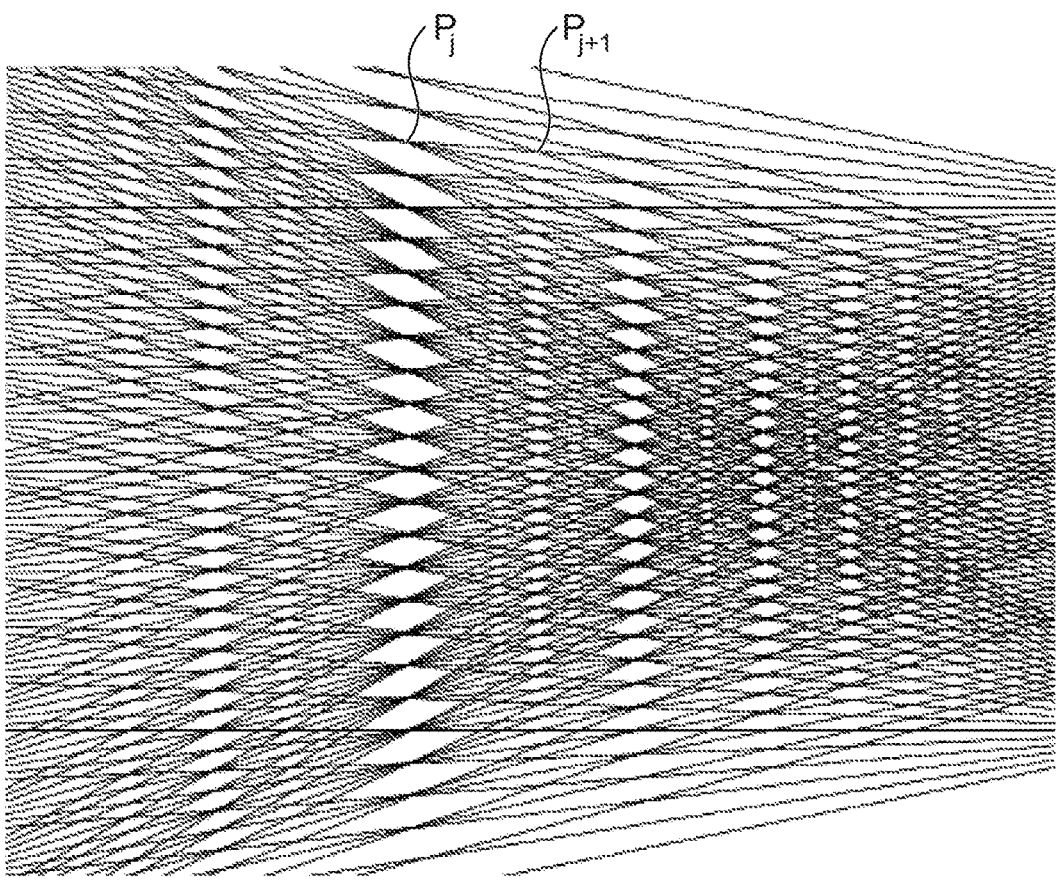
FIG. 3 illustrates sampling points according to the invention according to a detailed view.

According to a detailed view FIG. 3 illustrates sampling points $P_j$ according to the invention, located in the object field of a plenoptic camera.

A sampling point $P_j$, at the intersection of four object rays, and therefore associated with four pixels of the matrix optical sensor, and a sampling point $P_{j+1}$, at the intersection of two object rays, and therefore associated with two pixels of the matrix optical sensor are illustrated in particular.

Figure 4:
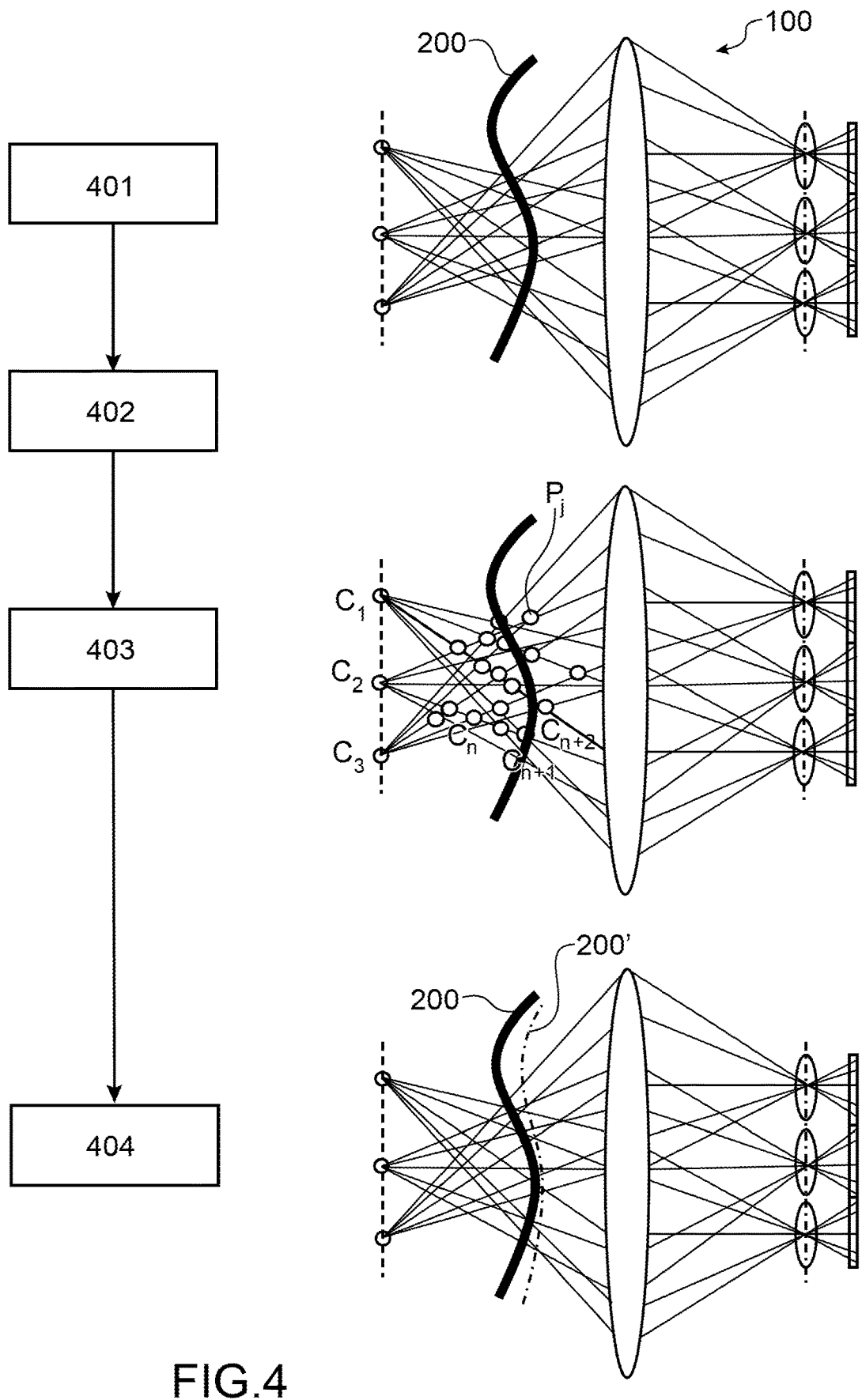
FIG. 4 schematically illustrates steps of a method according to the invention.

Steps of a method according to the invention will now be illustrated in reference to FIG. 4.

The method is illustrated by means of a flow chart and a series of schematic illustrations of the plenoptic camera.

The preliminary steps for determination of the coordinates of the sampling points, and determination of calibration data, are not shown in FIG. 4.

Neither is a step for determination of definition of a reconstruction grid shown, which will be used next to reconstruct the surface of interest.

In the example illustrated in FIG. 4, and so as to simplify explanations, the particular case is detailed in which the points of the reconstruction grid are constituted by the sampling points themselves.

In a first step 401, an image of a surface of interest 200 is acquired by means of the plenoptic camera 100, the surface of interest 200 being located in the object field of this camera.

The surface of interest 200 and the plenoptic camera 100 are shown to the right, as is a series of construction rays of the sampling points associated with said camera 100.

The plenoptic camera 100 is associated with calibration data such as defined hereinabove, and determined previously.

These calibration data link each sampling point $P_j$ to at least two pixels of the matrix optical sensor of the plenoptic camera.

In particular, each sampling point $P_j$ is defined by three-dimensional coordinates, in the object field of the plenoptic camera.

In a second step 402, the value of a dissimilarity index $C_n$ is calculated, for each point of the reconstruction grid, therefore here for each sampling point $P_j$.

This calculation is performed by means of the calibration data of the plenoptic camera, and of the image acquired at step 401.

The dissimilarity index $C_n$ is an index relative here to a single sampling point $P_j$, whereof the value depends on dispersion between the values of intensity taken by the pixels of the matrix optical sensor associated with this sampling point.

For example, when only two pixels are associated with a sampling point $P_j$, the dissimilarity index $C_n$ can be the difference in absolute value between the values of intensity taken by these two pixels, or another function of this difference (square of the difference for example) or another function of the couple of values of intensity.

As a variant, for sampling points associated with three pixels or more, the dissimilarity index $C_n$ can be the root mean square deviation between the values of intensity taken by these pixels, and an average of these values of intensity. As a variant, this is another function of the differences, in absolute value, between the values of intensity taken by these pixels, and an average of these values of intensity, or another function of this set of values of intensity.

In any case, the value of the dissimilarity index $C_n$ of a point of the reconstruction grid is all the lower since for each of the associated sampling points the values of intensity of the corresponding pixels are close.

Here, the value of the dissimilarity index $C_n$ of a point of the reconstruction grid equal to a sampling point is all the lower since the values of intensity of the corresponding pixels are close.

The value of intensity taken by a pixel is preferably a greyscale.

This is preferably a value located between 0 and 255 included, for encoding of the image on 8 bits.

Under ideal conditions, in particular when the surface of interest forms a Lambertian source, when a sampling point $P_j$ belongs to the surface of interest, the values of the corresponding pixels are equal.

In practice, these values are not necessarily equal, but closer than if the sampling point $P_j$ did not belong to the surface of interest.

The closer the sampling point is to a point of the surface of interest, the closer the values of intensity of the corresponding pixels.

It is therefore clear that the value taken by a dissimilarity index refers to a probability that the corresponding point of the reconstruction grid belongs to the surface of interest 200. The dissimilarity index can be considered as a function of an estimation of this probability.

On completion of step 402 there is a series of dissimilarity index values $C_n$, each associated with a point of the reconstruction grid, here combined with a sampling point.

In step 403 a three-dimensional distribution of the points of the reconstruction grid is built, here the sampling points $P_j$, each allocated with the corresponding value of the dissimilarity index $C_n$.

This three-dimensional distribution is shown to the right.

In other terms this is three-dimensional distribution of the values of the dissimilarity index $C_n$, each value being associated with the three-dimensional coordinates of a point of the reconstruction grid, here a sampling point $P_j$.

In step 404 this distribution is used to execute a three-dimensional reconstruction of the surface of interest.

In other terms, an estimation 200' of the three-dimensional coordinates of the surface of interest 200 is provided.

This step reconstruction exploits the fact that the dissimilarity index values refer to a probability that the corresponding point of the reconstruction grid belongs or not to the surface of interest 200.

The three-dimensional reconstruction implements an optimisation algorithm, using the dissimilarity indices $C_n$ and the associated three-dimensional coordinates.

The general idea is to look for a surface passing near the sampling points associated with a high probability of belonging to the surface of interest, and passing at a distance from the sampling points associated with a low probability of belonging to the surface of interest.

Preferably, three-dimensional distribution of the values of the dissimilarity index $C_n$ forms a cost function for an optimisation algorithm.

In particular, in step 404 a surface covering the object field of the plenoptic camera and associated with a minimal accumulated value of the dissimilarity indices is searched for.

The three-dimensional reconstruction can run an optimisation algorithm of minimal cut type, aiming to minimize a function of cost defined in the object field of the plenoptic camera, by means of the dissimilarity indices $C_n$ and the associated three-dimensional coordinates.

Such an algorithm offers high precision of the three-dimensional reconstruction.

As a variant, the three-dimensional reconstruction can run an optimisation algorithm of dynamic programming type.

Such an algorithm offers very fast calculating.

It consists of considering optimisation in the object field of the plenoptic camera as a combination of optimisations in several portions forming this object field, each portion being associated with a selection of optical elements 121, called sub-set of optical elements.

In particular, the optical centres of the optical elements are distributed according to a distribution grid, at the points of intersection between a first series of lines and a second series of lines of this distribution grid, and the sub-sets correspond to the optical elements associated with the same line of the first series, respectively the second series of lines.

For example, the optical elements of the matrix of optical elements are arranged in lines and columns, and the portions of the object field associated with each line, respectively with each column of optical elements, are considered separately.

The three-dimensional reconstruction can utilize hypotheses regarding the surface of interest.

For example, it is assumed that the surface of interest 200 is a smooth surface.

In addition or as a variant, it is assumed that the surface of interest 200 is a connected surface.

The method according to the invention executes high-resolution three-dimensional reconstruction, without being limited to the resolution of the matrix of optical elements.

The resolution obtained is typically of the order of 10 μm, whereas the pitch of the optical elements is 1 mm, or a ratio 100 between both.

Also, it is not limited by the difficulties linked to identification, on an image acquired by a plenoptic camera, of several pixels associated with the same point of the object field.

In fact, instead of starting from the image, searching for pixels associated with the same point of the object field of the plenoptic camera, and calculating by triangulation the corresponding intersections between object rays, the starting point is directly from sets of pixels known to be associated with the same point of the object field.

It can be considered that the method according to the invention executes principles close to the stereoscopic vision, in that it is based on investigation into intersections of rays originating from the same point of the surface of interest. But it differs fundamentally from this field in that it does not use two conventional cameras placed at two different sites. In a conventional camera there is no matrix of optical elements.

The invention also relates to a three-dimensional reconstruction device, not shown, comprising:
 a plenoptic camera 100, for acquisition of an image of the surface of interest 200;
 a memory, receiving the calibration data linked to said plenoptic camera, and if needed definition data of the reconstruction grid; and
 calculation means, receiving at input the image acquired by the plenoptic camera, as well as the calibration data, and if needed data relative to the reconstruction grid, and supplying a three-dimensional reconstruction of the surface of interest at output.

The calculation means comprise especially a processor and are arranged to conduct steps 402, 403 and 404 such as described hereinabove.

The calculation means are also configured to determine the coordinates of the sampling points and the calibration data associated with the plenoptic camera, to then store in the memory.

Next a variant of the invention is described, in which the points of the reconstruction grid are distributed uniformly in space, for example according to cubic meshing.

They differ thus from the sampling points $P_j$. The value of the dissimilarity index associated with a point of the reconstruction grid is therefore a combination of dispersions such as defined hereinabove, associated with neighbouring sampling points $P_j$ of this point of the reconstruction grid.

In this way, here too the value taken by a dissimilarity index relates to the probability that the corresponding point of the reconstruction grid belongs to the surface of interest.

Advantageously, dispersion is calculated such as defined hereinabove, for each of the sampling points $P_j$, then the value of the dissimilarity index of the points of the reconstruction grid is determined by interpolation of the dispersion values associated with each sampling point $P_j$, as a function of the positions of these sampling points in the object field.

Any other combination of these dispersion values can be possible.

The contribution of dispersion of a neighbouring sampling point can for example be weighted by the inverse of its distance from the relevant point of the reconstruction grid.

A dissimilarity index for each point of the reconstruction grid can be calculated directly, without having formally a separate calculation step of the dispersions of each of the sampling points $P_j$.

The three-dimensional distribution of likelihood index values obtained in this way produces a three-dimensional reconstruction of the surface of interest, as described hereinabove.

A maximal distance from the closest sampling point, so-called threshold value, can be determined.

All the points of the reconstruction grid located at a distance from the closest sampling point greater than this threshold value are identified.

All these points are allocated with the same value of the dissimilarity index $C_n$.

A maximal value of the dissimilarity index of the points of the reconstruction grid is fixed in this way.

This can be a value greater than the maximal value of the dispersions associated with the sampling points $P_j$.

To consolidate the result obtained by means of a method according to the invention, the surface of interest can be lit successively by different types of lighting, and each time a different image is acquired by means of the plenoptic camera 100.

The types of lighting can differ by a light intensity of the lighting, by a position of the lighting source, by a texture (a texture can be projected from a single source emitting different intensities according to directions, or from several sources emitting at different light intensities).

The plenoptic camera stays fixed relative to the surface of interest during this series of acquisitions.

For each point of the reconstruction grid a dissimilarity index is calculated, which this time combines information originating from several images.

In particular, dispersion associated with a sampling point is replaced by a combination of dispersions associated with this same sampling point and each calculated from one of the acquired images.

The combination of dispersion is for example an average, or another function of the dispersions obtained on the several acquired images.

Figure 5A:
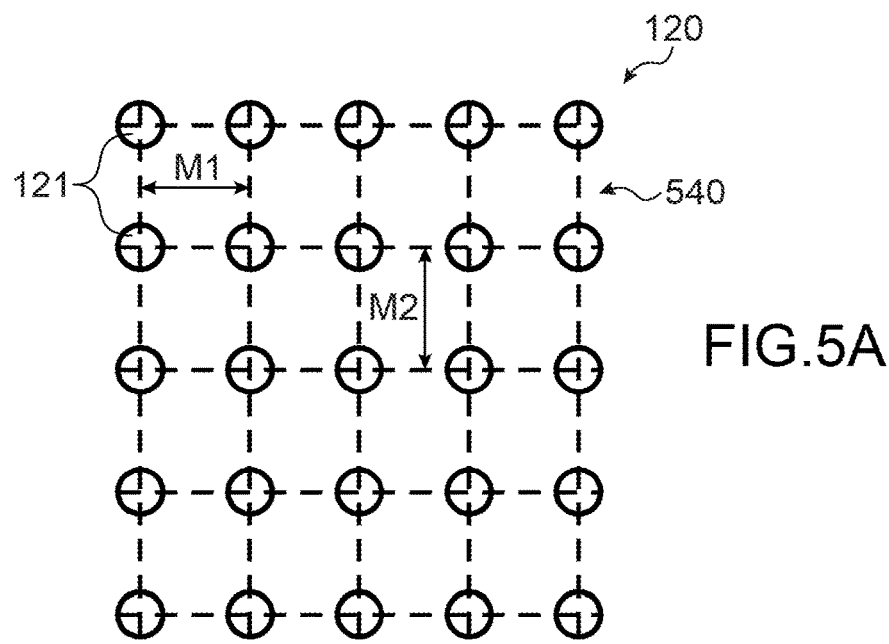
FIGS. 5A and 5B respectively illustrate a first embodiment of a matrix of optical elements used in the method according to the invention, and corresponding distribution of the sampling points in the object field of the plenoptic camera.
Figure 5B:
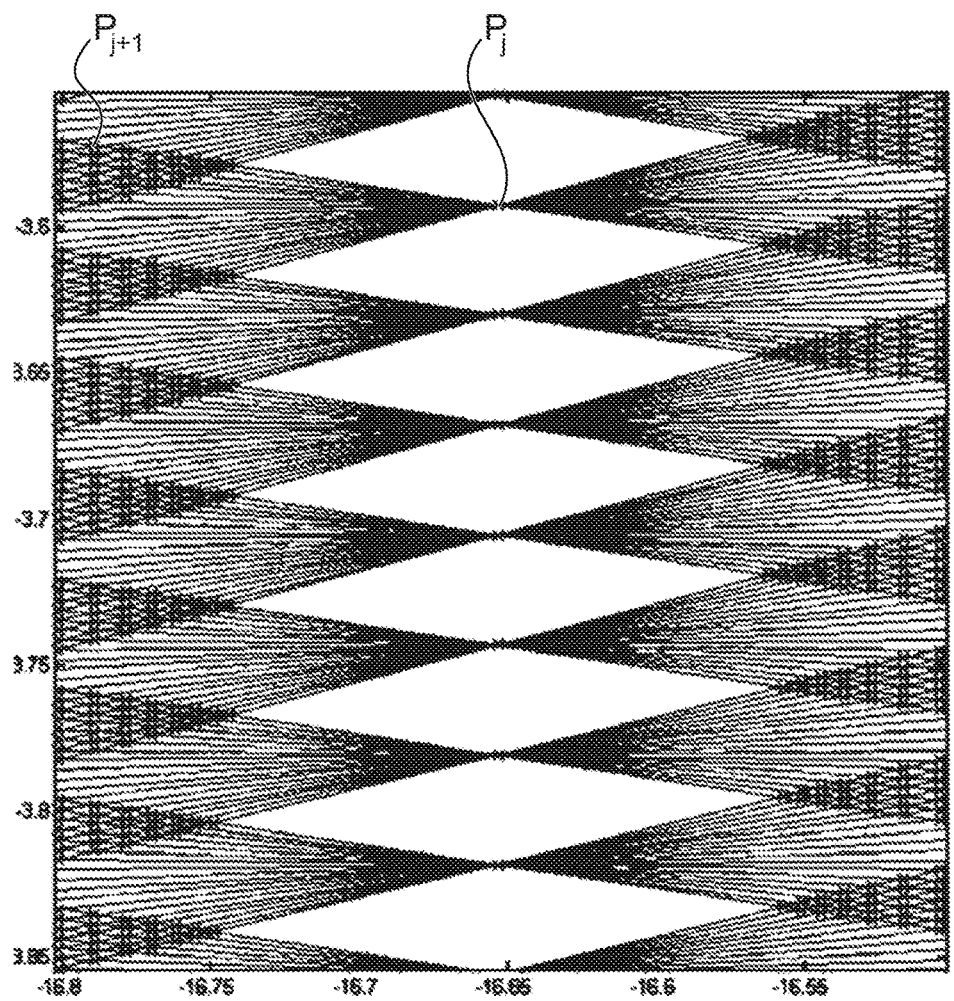

FIGS. 5A and 5B illustrate respectively a first embodiment of a matrix of optical elements 120 of a plenoptic camera used in the method according to the invention, and corresponding distribution of the sampling points $P_j$ in the object field of the plenoptic camera.

The optical centres of the optical elements 221 are distributed according to a distribution grid 540 (shown in dotted lines), at the points of intersection between a first series of straight lines (here vertical lines), and a second series of straight lines (here horizontal lines) secant (preferably perpendicular) with the straight lines of the first series.

Here, the lines of the first series of lines are distributed regularly, according to a repetition pitch M1, and the lines of the second series of lines are distributed regularly, according to a repetition pitch M2 (optionally equal to M1).

In other terms, the optical elements are distributed in lines and columns, the distance separating two adjacent lines, respectively two adjacent columns, being the same throughout the matrix of optical elements.

Distribution of the sampling points in the object field is of the type of that illustrated in FIG. 3.

There are many multiple intersections.

Near the multiple intersections, there are regions in the object field of the plenoptic camera which receive very few sampling points, limiting the quality of the three-dimensional reconstruction of the surface of interest is in these regions.

Figure 6A:
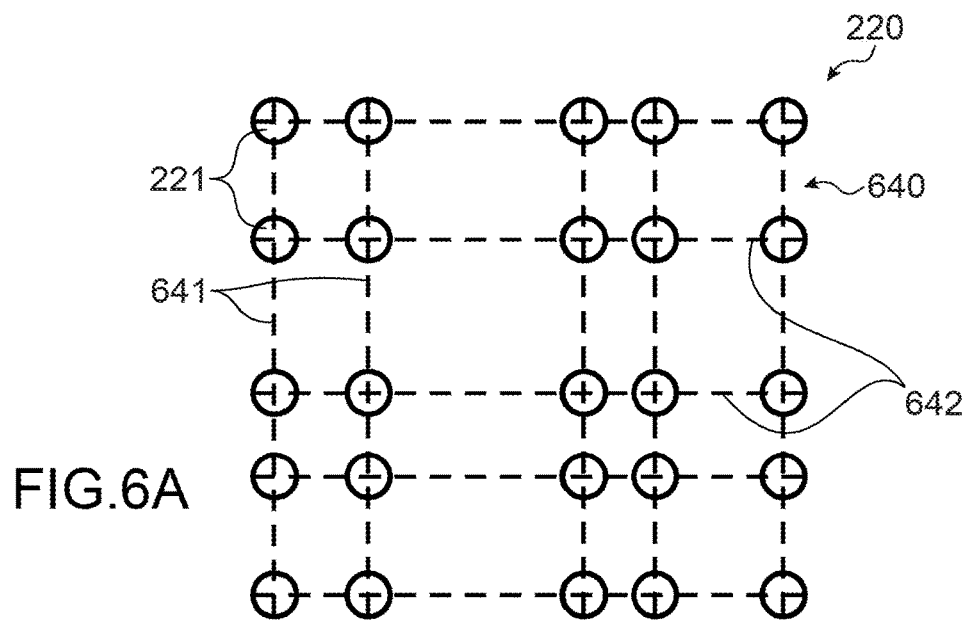
FIGS. 6A and 6B respectively illustrate a second embodiment of a matrix of optical elements used in the method according to the invention, and corresponding distribution of the sampling points in the object field of the plenoptic camera.
Figure 6B:
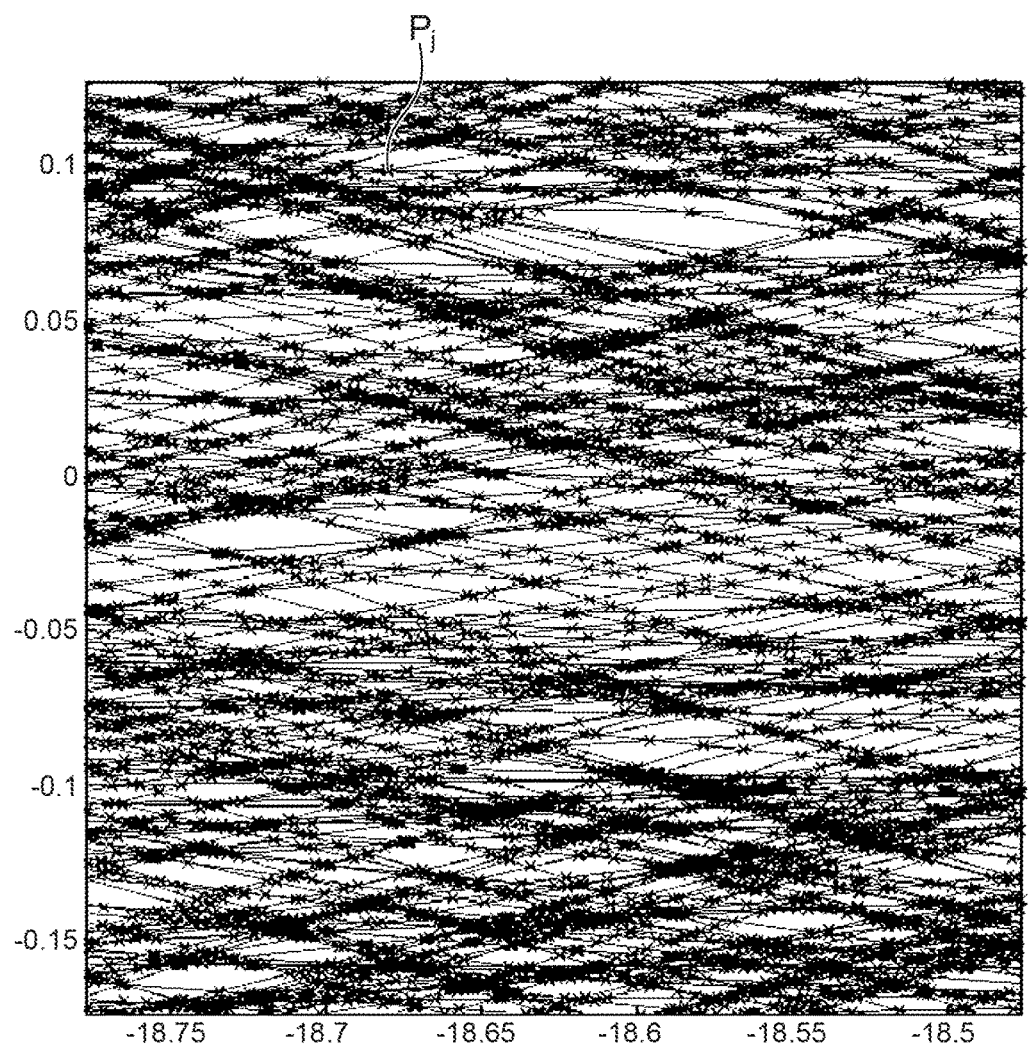

FIGS. 6A and 6B illustrate respectively a second embodiment of a matrix of optical elements 220 of a plenoptic camera used in the method according to the invention, and corresponding distribution of the sampling points $P_j$ in the object field of the plenoptic camera.

The optical centres of the optical elements 221 are distributed according to a distribution grid 640, as described hereinabove.

Here, the lines 641 of the first series of lines of the distribution grid are distributed irregularly.

This can more particularly be random distribution, around a first average value, and inside a predetermined first interval.

The first average value is the average of the distances between two directly neighbouring lines 641.

Random distribution of values designates a distribution the values of which are subject to random.

For example, a lower terminal of the first interval is 95% of said first average value, and an upper terminal of the first interval is 105% of said first average value.

As a variant, a lower terminal is 90% of said first average value, and an upper terminal is 110% of said first average value.

In the same way, the lines 642 of the second series of lines of the distribution grid are distributed irregularly.

The distance values between two directly neighbouring lines 642 are distributed, preferably randomly, around a second average value, and inside a predetermined second interval.

The lower and upper terminals of the second interval are defined in the same way as for those of the first interval.

The second average value is the average of the distances between two directly neighbouring lines 642.

The first and second average values can be equal.

In other terms, the optical elements are distributed in lines and columns, the distance separating two adjacent lines, respectively two adjacent columns, being irregular. This distance is distinct for at least two pairs of adjacent lines, respectively at least two pairs of adjacent columns.

Distribution of the sampling points in the object field is illustrated in FIG. 6B.

The sampling points are distributed more uniformly than in FIG. 5B.

Consequently, there is no region in the object field of the plenoptic camera, limiting the quality of the three-dimensional reconstruction if the surface of interest were in this region.

The irregularity therefore minimizes the greatest distance between any point of the object field of the plenoptic camera and the closest sampling point.

This embodiment corresponds to astute application of the basic idea of patent application brevet FR-1558338, to the present invention in which it is advantageous to have uniform distribution of the sampling points.

The embodiments of FIGS. 5A and 6A can be combined, the lines of a series of lines being distributed regularly, and the lines of the other series of lines being distributed irregularly.

Figure 7A:
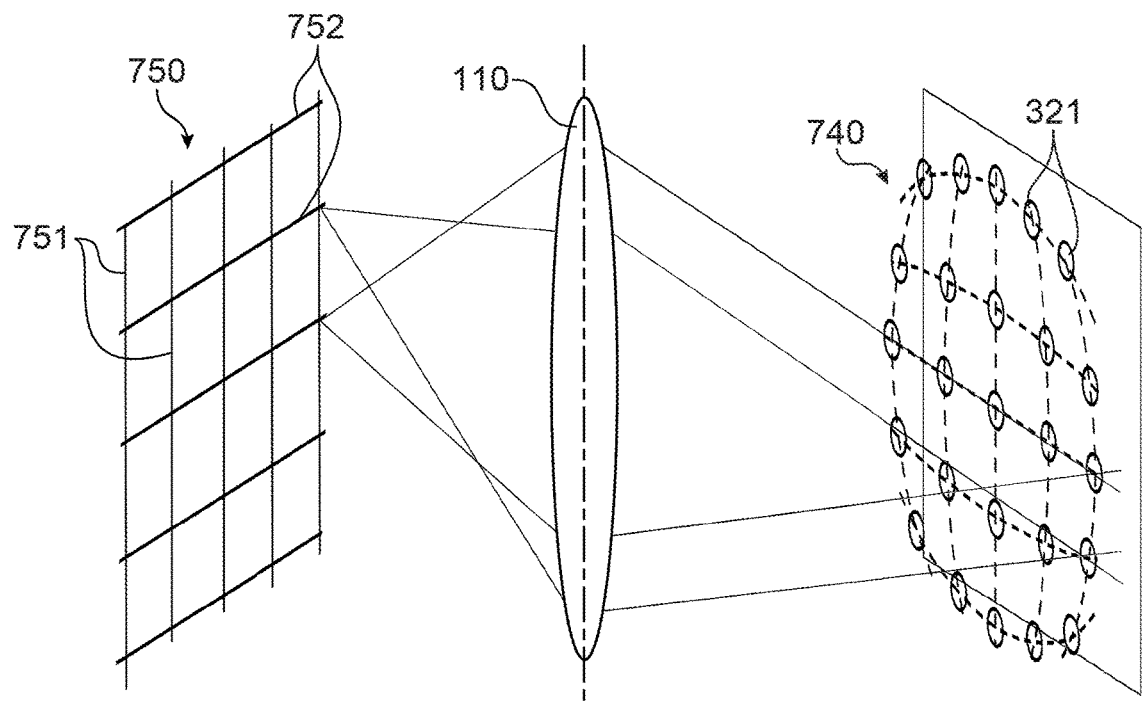
FIGS. 7A and 7B illustrate a third embodiment of a matrix of optical elements used in the method according to the invention.
Figure 7B:
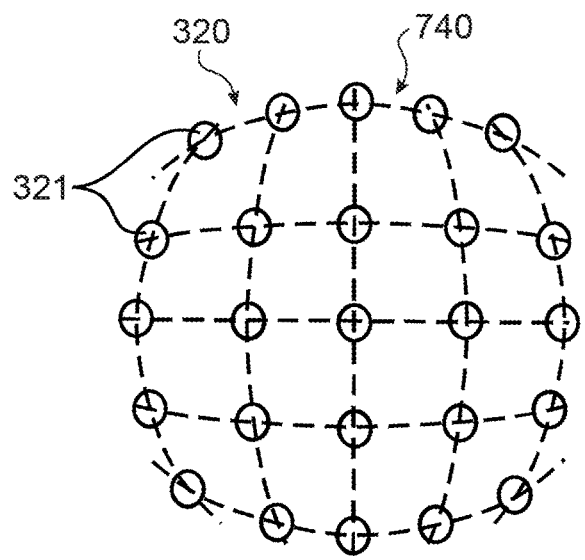

FIGS. 7A and 7B illustrate a third embodiment of a matrix 320 of optical elements of a plenoptic camera used in the method according to the invention.

According to this embodiment, the entry optical system 110 of the plenoptic camera exhibits optical distortion aberration.

The distribution grid 740 such as defined hereinabove is this time the image, by the entry optical system 110, of an object grid 750 constituted by a first series of straight lines 751 (here vertical) and of a second series of straight lines 752 (here horizontal).

The distribution grid 740 is deformed by the distortion of the entry optical system. Each series of lines is formed here from a central straight line surrounded on both sides by curved lines, characteristic of barrel distortion.

This distribution grid 740 allows the distortion aberration exhibited by the entry optical system not to reduce the number of sampling points of the object field of the plenoptic camera.

The invention is not limited to such distortion, and the entry optical system can present pincushion distortion, or a combination of barrel distortion and pincushion distortion.

Here, the term "grid" is not limited to a square or rectangular grid, formed by a first series of horizontal lines and of a second series of vertical lines.

According to the invention, the distribution grid 740 can especially designate a deformed square or rectangular grid. In this case, the distribution grid is formed from a first series of lines which do not cross, and from a second series of lines which do not cross. Each line of the first series of line crosses all the lines of the second series of lines. Lines of the first and/or of the second series of lines are curved lines.

In FIG. 7A, the object space, upstream from the entry optical system 110, is shown according to a perspective view according to a first viewing angle, and the image space, downstream from the entry optical system 110, is shown according to a perspective view according to a second viewing angle.

In FIG. 7B, the matrix 320 of optical elements 321, according to this third embodiment, is shown according to a frontal view.

Figure 8:
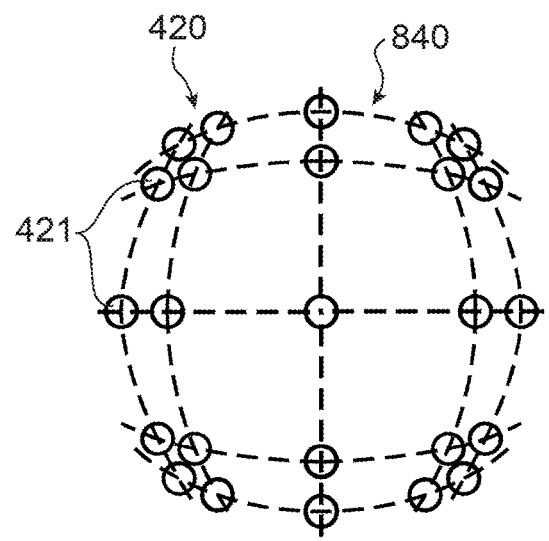
FIG. 8 illustrates a fourth embodiment of a matrix of optical elements used in the method according to the invention.

FIG. 8 illustrates a fourth embodiment of a matrix of optical elements of a plenoptic camera used in the method according to the invention.

This embodiment is a combination of the embodiment of FIGS. 6A, 6B, and 7A, 7B.

In particular, the distribution grid 840 is the image of an object grid, by an entry optical system exhibiting distortion.

The object grid is formed from a first series of straight lines and a second series of straight lines.

The distances between two directly neighbouring lines of the first series of lines of the object grid are distributed irregularly, and/or the distances between two directly neighbouring lines of the second series of lines of the object grid are distributed irregularly.

Preferably, irregular distributions are random.

The distances between two directly neighbouring lines of the first series of lines of the object grid are advantageously between 95% and 105% of a first average value, and/or the distances between two directly neighbouring lines of the second series of lines of the object grid are advantageously between 95% and 105% of a second average value which can be equal to the first average value.

According to another variant, not shown, the plenoptic camera used in the method according to the invention comprises a first matrix of optical elements, and a second matrix of optical elements, coplanar with the first matrix. The first and the second matrices of optical elements are offset slightly relative to each other.

In each of these two matrices, the optical centres of the optical elements can be distributed according to one or the other of the examples detailed hereinabove.

Dynamic sampling can be carried out to further multiply a number of sampling points of the object field of the plenoptic camera.

In other terms, temporal or spatial multiplexing of the plenoptic camera is performed according to different ways, associated with different series of sampling points of the object space, such that the total number of sampling points of the object space is increased.

For example, each optical element is mounted on a mobile support connected to an actuator, to control displacement of the optical element in the plane $\pi'$, independently of the position of the other optical elements.

The optical elements can be shifted to place them successively according to different distribution grids. A certain sampling of the object space corresponds to each distribution grid. Denser sampling of the object space is carried out this way finally.

As a variant, the matrix of optical elements remains fixed, and the matrix optical sensor is mounted on a mobile support, connected to an actuator to control displacement in the plane of the matrix optical sensor.

As a variant, the macro-pixels associated with the different optical elements overlap partially. The same pixel can thus correspond to several optical elements.

An array of controllable shutters such as a liquid crystal screen is placed upstream from the matrix of optical elements to block or let through light spreading towards the optical elements, such that at each instant a pixel corresponds to a single optical element only.

A plurality of states of the network of shutters is defined. A different series of sampling points of the object space corresponds to each state. Varying the state of the array of shutters over time finally creates denser sampling of the object space.

According to another variant, the plenoptic camera comprises, juxtaposed or interlocked in the same plane, at least two matrices of optical elements each dedicated to a different wavelength.

Upstream from each optical element is a bandpass filter for associating each optical element with detection of one wavelength in particular and defining said several matrices of optical elements.

A different sampling of the object space corresponds to each matrix of optical elements. When operating, the object is lit successively by several wavelengths.

What is claimed is:

1. A method of three-dimensional reconstruction of a surface of interest, using a plenoptic camera comprising an entry optical system, a matrix optical sensor comprising a plurality of pixels, and a matrix of optical elements arranged between the entry optical system and the matrix optical sensor, wherein the method comprises:
    determination of three-dimensional coordinates of a series of points of an object field of the plenoptic camera, so-called sampling points;
    determination of calibration data, associating with each sampling point a set of at least two pixels of the matrix optical sensor;
    definition of a three-dimensional grid, so-called reconstruction grid, extending in the object field of the plenoptic camera and whereof each point is associated with one or more sampling points;
    acquisition of at least one image of the surface of interest by means of the plenoptic camera;
    from the calibration data and the at least one image of the surface of interest, calculation, for each point of the reconstruction grid, of a value of a dissimilarity index which is a function of one or more dispersions, each dispersion being representative of distancing between the values of intensity taken on the at least one image of the surface of interest by the pixels associated with the sampling point itself associated with said point of the reconstruction grid, or by the pixels associated with one of the sampling points themselves associated with said point of the reconstruction grid;
    determination of a three-dimensional distribution of the points of the reconstruction grid, each allocated with their value of the dissimilarity index; and
    three-dimensional reconstruction of the surface of interest, by use of said three-dimensional distribution of the points of the reconstruction grid each allocated with their value of the dissimilarity index, and by searching for a surface extending in the object field of the plenoptic camera and associated with a minimal accumulated value of the dissimilarity index.

2. The method according to claim 1, wherein the points of the reconstruction grid are constituted by the sampling points, and wherein the dissimilarity index of a point of the reconstruction grid is function of the dispersion between the values of intensity taken, on the image of the surface of interest, by the pixels associated with the corresponding sampling point.

3. The method according to claim 1, wherein the reconstruction grid is a regular grid, and wherein the calculation, for each point of the reconstruction grid, of the value of a dissimilarity index, further comprises:
attribution, to all points of the reconstruction grid located at a distance from a sampling point greater than a predetermined threshold, of the same value of the dissimilarity index, so-called extreme value; and
for each of the other points of the reconstruction grid, calculation, for each sampling point associated with this point of the reconstruction grid, of the dispersion between the values of intensities taken on the image of the surface of interest by the pixels associated with said sampling point, and a combination of the several dispersions calculated to obtain the dissimilarity index.

4. The method according to claim 1, wherein the three-dimensional reconstruction performs the search of a surface located in the object field of the plenoptic camera passing through a series of points of the reconstruction grid associated with a minimal accumulated value of the values of the dissimilarity index.

5. The method according to claim 1, wherein the three-dimensional reconstruction executes an algorithm of minimal cut.

6. The method according to claim 1, wherein the three-dimensional reconstruction executes a dynamic programming algorithm, considering sub-sets of optical elements of the matrix of optical elements.

7. The method according to claim 1, wherein the steps of determination of the three-dimensional coordinates of the sampling points and determination of the calibration data further comprise:
for each couple of an optical element of the matrix of optical elements, and a pixel of the matrix optical sensor associated with this optical element, determination of an image ray connecting the optical centre of the optical element and the centre of the pixel;
for each image ray determined in this way, calculation of a corresponding object ray, conjugated of the image ray by the entry optical system;
determination of all the points of intersection between at least two object rays, located in the object field of the plenoptic camera, these points of intersection forming the sampling points; and
determination of the calibration data by identifying, for each sampling point, the at least two corresponding object rays, these object rays themselves being associated with at least two image rays and at least two pixels of the matrix optical sensor.

8. The method according to claim 1, wherein the steps of determination of the three-dimensional coordinates of the sampling points and determination of the calibration data further comprise:
displacement of a light point in the object field of the plenoptic camera;
for each position of the light point, determination of the presence or the absence of at least two illuminated pixels on the matrix optical sensor to identify the sampling points; and
for each sampling point identified in this way, identification of the at least two illuminated pixels, to determine the corresponding set of at least two pixels of the matrix optical sensor.

9. The method according to claim 1, wherein the acquisition step of an image of the surface of interest is conducted by means of a plenoptic camera in which:
the optical centres of the optical elements of the matrix of optical elements are distributed according to a distribution grid, at the points of intersection between a first series of straight lines and a second series of straight lines of this distribution grid; and
the lines of the first series of lines of the distribution grid are distributed at irregular intervals and/or the lines of the second series of lines of the distribution grid are distributed at irregular intervals.

10. The method according to claim 9, wherein the acquisition step of an image of the surface of interest is conducted by means of a plenoptic camera in which the distances between two directly neighbouring lines of the first series of lines of the distribution grid are between 95% and 105% of a first average value, and/or the distances between two directly neighbouring lines of the second series of lines of are between 95% and 105% of a second average value which can be equal to the first average value.

11. The method according to claim 9, wherein the acquisition step of an image of the surface of interest is conducted by means of a plenoptic camera in which the distances between two directly neighbouring lines of the first series of lines of the distribution grid are distributed randomly, and/or the distances between two directly neighbouring lines of the second series of lines of the distribution grid are distributed randomly.

12. The method according to claim 1, wherein the acquisition step of an image of the surface of interest is conducted by means of a plenoptic camera in which:
the optical centres of the optical elements of the matrix of optical elements are distributed according to a distribution grid, at the points of intersection between a first series of lines and a second series of lines of this distribution grid;
an object grid, whereof the distribution grid is the image by the entry optical system, is constituted by a first series of straight lines, parallel to each other, and by a second series of straight lines, parallel to each other and secant with the lines of the first series of lines; and
the lines of the first and of the second series of lines of the distribution grid comprise a plurality of curved lines.

13. The method according to claim 12, wherein the acquisition step of an image of the surface of interest is conducted by means of a plenoptic camera in which the lines of the first series of lines of the object grid are distributed at irregular intervals and/or the lines of the second series of lines of the object grid are distributed at irregular intervals.

14. The method according to claim 1, wherein the method further comprises the acquisition of several images of the surface of interest by means of the plenoptic camera, associated with a plurality of lighting conditions for the surface of interest, and wherein the dissimilarity index associated with each point of the reconstruction grid is obtained by combining dispersions associated with the same sampling point and with each of the several lighting conditions.

15. A three-dimensional reconstruction device configured to conduct the steps of the method according to claim 1, and comprising:
- a plenoptic camera;
- a memory, for storing the calibration data; and
- a processor, wherein the processor comprises an input connected to the plenoptic camera and to the memory so as to receive the at least one image acquired by the plenoptic camera and the calibration data stored in the memory, wherein the processor comprises an output to output a three-dimensional reconstruction of the surface of interest, and wherein the processor is configured to calculate the value of the dissimilarity index for each point of the reconstruction grid, determine the three-dimensional distribution of the points of the reconstruction grid each allocated with their value of the dissimilarity index, and determine said three-dimensional reconstruction of the surface of interest by use of said three-dimensional distribution of the points of the reconstruction grid each allocated with their value of the dissimilarity index and by searching for a surface extending in the object field of the plenoptic camera and associated with a minimal accumulated value of the dissimilarity index.

* * * * *